(12) United States Patent
Nagasaka et al.

(10) Patent No.: US 11,542,160 B2
(45) Date of Patent: Jan. 3, 2023

(54) METHOD FOR PRODUCING MAGNESIUM HYDRIDE AND METHOD FOR PRODUCING TETRAHYDROBORATE

(71) Applicants: SINTOKOGIO, LTD., Nagoya (JP); NATIONAL UNIVERSITY CORPORATION SHIZUOKA UNIVERSITY, Shizuoka (JP)

(72) Inventors: Masahiko Nagasaka, Toyokawa (JP); Tomoji Ishida, Toyokawa (JP); Akiomi Uchiyama, Toyokawa (JP); Yasutaka Haga, Toyokawa (JP); Akihisa Ogino, Hamamatsu (JP)

(73) Assignees: SINTOKOGIO, LTD., Nagoya (JP); NATIONAL UNIVERSITY CORPORATION SHIZUOKA UNIVERSITY, Shizuoka (JP)

( * ) Notice: Subject to any disclaimer, the term of this patent is extended or adjusted under 35 U.S.C. 154(b) by 78 days.

(21) Appl. No.: 16/999,621

(22) Filed: Aug. 21, 2020

(65) Prior Publication Data
US 2021/0061658 A1    Mar. 4, 2021

(30) Foreign Application Priority Data

Aug. 29, 2019   (JP) .............................. JP2019-156623
Aug. 29, 2019   (JP) .............................. JP2019-156627

(Continued)

(51) Int. Cl.
*C01B 6/00*    (2006.01)
*C01B 6/04*    (2006.01)

(52) U.S. Cl.
CPC ................ *C01B 6/003* (2013.01); *C01B 6/04* (2013.01); *C01P 2004/03* (2013.01)

(58) Field of Classification Search
CPC ......... C01B 6/003; C01B 6/04; C01B 3/0026; C01B 6/17; C01P 2004/03; Y02E 60/32
See application file for complete search history.

(56) References Cited

U.S. PATENT DOCUMENTS

| | | | | |
|---|---|---|---|---|
| 3,304,249 A * | 2/1967 | Katz | .......................... | B01J 8/42 34/364 |
| 2006/0106195 A1 | 5/2006 | Kong | | |
| 2010/0163434 A1* | 7/2010 | Smith, Jr. | ................. | C01B 6/00 216/52 |

FOREIGN PATENT DOCUMENTS

| | | |
|---|---|---|
| JP | 2002-193604 A | 7/2002 |
| JP | 2004-224684 A | 8/2004 |

(Continued)

OTHER PUBLICATIONS

Crivello et al. "Review of magnesium hydride-based materials: development and optimisation" Appl. Phys. A (2016) 122:97 (Year: 2016).*

(Continued)

*Primary Examiner* — Steven J Bos
*Assistant Examiner* — Syed T Iqbal
(74) *Attorney, Agent, or Firm* — Faegre Drinker Biddle & Reath LLP

(57) ABSTRACT

Provided is a method for producing magnesium hydride, the method including a plasma treatment step of exposing a raw material mixture of at least one magnesium-based raw material selected from the group consisting of magnesium, magnesium hydroxide, and magnesium oxide and magnesium hydride to hydrogen plasma.

23 Claims, 2 Drawing Sheets

(30) Foreign Application Priority Data

Aug. 29, 2019 (JP) .............................. JP2019-156628
Jun. 15, 2020 (JP) .............................. JP2020-103132
Jun. 30, 2020 (JP) .............................. JP2020-113022

(56) References Cited

FOREIGN PATENT DOCUMENTS

| JP | 2011032131 A | * | 2/2011 |
| JP | 2018-203607 A | | 12/2018 |
| JP | 2019-182710 A | | 10/2019 |
| WO | WO-2015/190403 A1 | | 12/2015 |

OTHER PUBLICATIONS

Kojima et al. "Recycling process of sodium metaborate to sodium borohydride" International Journal of Hydrogen Energy 28 (2003) 989-993 (Year: 2003).*

Li et al. "P reparation of sodium borohydride by the reaction of MgH2 with dehydrated borax through ball milling at room temperature" Journal of Alloys and Compounds 349 (2003) 232-236 (Year: 2002).*

Takahashi, Takuya et al., "Recycling of Sodium Metaborate to Sodium Borohydride by Hydrogen Plasma Treatment," Jan. 15, 2019, p. 138-p. 139.

* cited by examiner

METHOD FOR PRODUCING MAGNESIUM HYDRIDE AND METHOD FOR PRODUCING TETRAHYDROBORATE

TECHNICAL FIELD

The present disclosure relates to a method for producing magnesium hydride and a method for producing tetrahydroborate.

BACKGROUND

As a method for producing magnesium hydride, a method of irradiating a magnesium compound as a raw material with hydrogen plasma to produce magnesium hydride, and depositing the magnesium hydride on a depositer having a surface set to be equal to lower than a deposition temperature of the magnesium hydride and then recovering the magnesium hydride, has been proposed (for example, Patent Literature 1).

Patent Literature 1: Japanese Unexamined Patent Publication No. 2018-203607

SUMMARY

However, in the method described in Patent Literature 1, since the magnesium hydride deposited on the surface of the depositer is recovered, the mass production of the magnesium hydride is difficult. Furthermore, in the first place, the deposition rate of the magnesium hydride cannot be said to be sufficient.

The present disclosure has been conceived in view of the above-described circumstances and an object thereof is to provide a novel method for producing magnesium hydride by which magnesium hydride can be more efficiently produced. Another object of the present disclosure is to provide a method for producing tetrahydroborate by using magnesium hydride obtained by the above-described production method.

A method for producing magnesium hydride according to an aspect of the present disclosure includes a plasma treatment step of exposing a raw material mixture of at least one magnesium-based raw material selected from the group consisting of magnesium, magnesium hydroxide, and magnesium oxide and magnesium hydride to hydrogen plasma.

In an embodiment, the plasma treatment step may be performed while heating the raw material mixture.

In an embodiment, the plasma treatment step may be performed while fluidizing the raw material mixture.

In an embodiment, the plasma treatment step may be performed while supplying a thermal electron.

In an embodiment, a mass ratio of the magnesium hydride to a mass of the magnesium-based raw material may be 1/1000 to 1/1.

In an embodiment, the above-described production method may further include a raw material mixture preparation step of obtaining the raw material mixture by mixing the magnesium-based raw material and the magnesium hydride before the plasma treatment step.

A method for producing tetrahydroborate according to an aspect of the present disclosure includes a mechanochemical treatment step of subjecting an object to be treated containing borate and magnesium hydride obtained by the above-described method for producing magnesium hydride to a mechanochemical treatment.

In an embodiment, the mechanochemical treatment step may be performed by using a medium stirring mill.

A method for producing tetrahydroborate according to an aspect of the present disclosure includes a high-temperature and high-pressure treatment step of subjecting an object to be treated containing borate and magnesium hydride obtained by the above-described method for producing magnesium hydride to a thermal treatment under conditions including a temperature of 350° C. or higher and an absolute pressure of 0.2 MPa or more.

A method for producing tetrahydroborate according to an aspect of the present disclosure includes a plasma treatment step of exposing a mixture of borate and magnesium hydride obtained by the above-described method for producing magnesium hydride to hydrogen plasma or inert gas plasma.

In an embodiment, the hydrogen plasma may be generated by using a source gas containing at least one of hydrogen gas and hydrocarbon gas.

In an embodiment, the inert gas plasma may be generated by using a source gas containing at least one selected from the group consisting of nitrogen gas, argon gas, helium gas, and neon gas.

In an embodiment, the hydrogen plasma and the inert gas plasma may be microwave plasma or RF plasma.

In an embodiment, the above-described production method may further include a preheating step of heating the mixture before the plasma treatment step.

In an embodiment, the plasma treatment step may be performed while heating the mixture.

In an embodiment, the plasma treatment step may be performed while fluidizing the mixture.

A method for producing tetrahydroborate according to an aspect of the present disclosure includes a thermal treatment step of heating a mixture of borate and magnesium hydride obtained by the above-described method for producing magnesium hydride to 350° C. or higher in a gas atmosphere containing hydrogen (H) as a constituent element.

In an embodiment, the thermal treatment step may be performed while fluidizing the mixture.

In an embodiment, an average particle size of the borate may be 500 μm or less.

In an embodiment, the borate may be sodium metaborate.

According to the present disclosure, it is possible to provide a novel method for producing magnesium hydride by which magnesium hydride can be more efficiently produced. Furthermore, according to the present disclosure, it is possible to provide a method for producing tetrahydroborate by using magnesium hydride obtained by the above-described production method. Since the method for producing magnesium hydride of the present disclosure can realize cost reduction and high productivity, the method can be said to be very suitable for industrial application.

DETAILED DESCRIPTION

Figure 1:
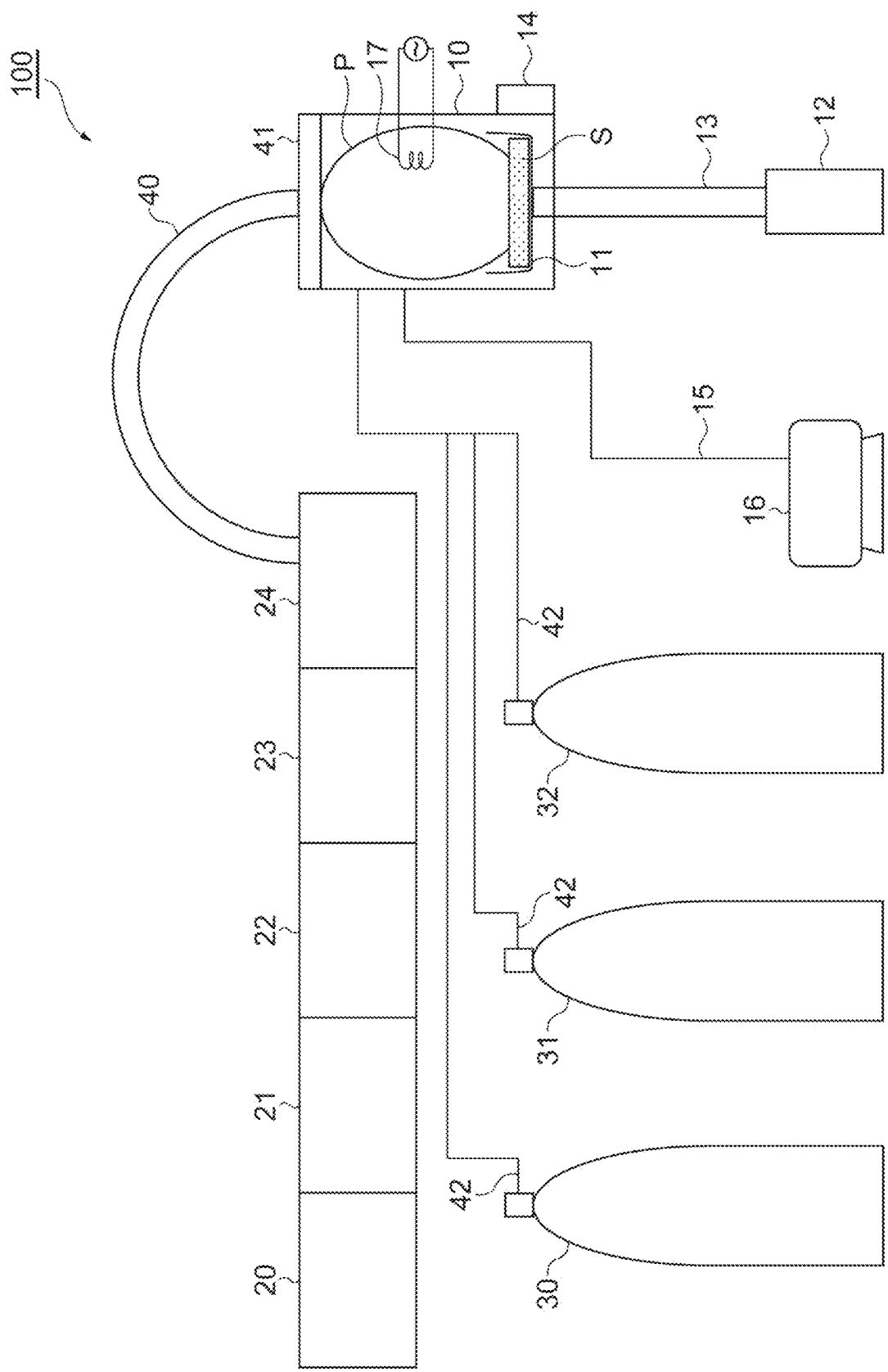
FIG. 1 is a schematic diagram illustrating an example of an apparatus for producing magnesium hydride.

Hereinafter, embodiments of the present disclosure will be described in detail with reference to the drawings depending on the cases. However, the present disclosure is not limited to the following embodiments.

<Method for Producing Magnesium Hydride>

A method for producing magnesium hydride according to the present embodiment includes a plasma treatment step of exposing a raw material mixture of a magnesium-based raw material and magnesium hydride to hydrogen plasma.

(Plasma Treatment Step)

In the plasma treatment step, the above-described raw material mixture is treated by hydrogen radical (H radical) or hydrogen ion having extremely high activity. For example, in the case of using magnesium oxide as the magnesium-based raw material, the bonding site of the oxygen atom of the magnesium oxide is cleaved to remove the oxygen atom, the hydrogen atom is bonded to a pair of electrons to which the oxygen atom had been bonded, and thereby hydrogenation of the magnesium oxide is performed. This reaction can be expressed as the following Formula (1-1).

$$MgO + 2H_2 \rightarrow MgH_2 + H_2O \quad (1\text{-}1)$$

On the other hand, in the case of using magnesium hydroxide or magnesium (magnesium metal) as the magnesium-based raw material, the reactions in this step can be expressed as the following Formulas (1-2) and (1-3), respectively.

$$Mg(OH)_2 + 2H_2 \rightarrow MgH_2 + 2H_2O \quad (1\text{-}2)$$

$$Mg + H_2 \rightarrow MgH_2 \quad (1\text{-}3)$$

In this step, it was found that the chemical reaction rate is exponentially increased as compared to the case of subjecting only the magnesium-based raw material to the plasma treatment. The reason for this is speculated as follows by the inventors. That is, it is considered that a small amount of magnesium hydride contained in the raw material mixture functions as a catalyst in a hydrogenation reaction or a reduction reaction of the magnesium-based raw material. It is considered that the magnesium hydride generated as a result thereof further functions as a catalyst in a hydrogenation reaction or a reduction reaction of the magnesium-based raw material, and thereby magnesium hydride can be efficiently obtained. It can be said to be new finding found by the present inventors that the magnesium hydride contained in the magnesium-based raw material in advance effectively functions as an autocatalyst of the magnesium-based raw material.

In this step, other than $MgH_2$, $MgHx$ (0<x<2) may be generated. It is speculated that, when $MgH_2$ generated by the plasma treatment is further subjected to the plasma treatment, the hydrogen atom of $MgH_2$ is sputtered to be desorbed, and thereby $MgHx$ is generated. From this, it is considered that the generation of $MgHx$ corresponds to the feature in production of magnesium hydride using the plasma treatment. Therefore, by performing the composition analysis of the magnesium hydride, whether or not the magnesium hydride is magnesium hydride obtained through the plasma treatment can be detected. MgHx contained in the magnesium hydride may be a marker for detection. Incidentally, in a reaction with borate described below, although $MgH_2$ is suitable as a reducing agent from the viewpoint of hydrogen element content, $MgHx$ may also sufficiently function as a reducing agent. The presence of $MgHx$ can be confirmed by subjecting the produced sample to Raman spectroscopic analysis. In the Raman spectroscopic analysis, for example, distinctive peaks of $MgH_2$ appear in the vicinity of 305 to 315 $cm^{-1}$ (for example, 311 $cm^{-1}$), 950 to 960 $cm^{-1}$ (for example, 956 $cm^{-1}$), and 1280 to 1290 $cm^{-1}$ (for example, 1286 $cm^{-1}$), and distinctive peaks of $MgHx$ appear in the vicinity of 250 to 265 $cm^{-1}$ (for example, 257 $cm^{-1}$).

The hydrogen plasma used in the hydrogen plasma treatment can be generated by using a gas containing hydrogen (H) as a constituent element, for example, a source gas containing at least one of hydrogen gas and hydrocarbon gas. Furthermore, $NH_3$ gas or the like can also be used. Incidentally, by using a gas containing an element, which is more easily oxidized than hydrogen, such as hydrocarbon ($CH_4$, $C_2H_2$, $C_6H_6$, or the like), the effect of cleaving the bonding site of the oxygen atom of the magnesium oxide or the like to remove the oxygen atom can be further enhanced. According to this, improvement in the production rate of magnesium hydride is expected. For the same effect, a gas containing an element, which is more easily oxidized than hydrogen, such as carbon monoxide, may be contained in the source gas. By using a combination of such a gas with the gas containing hydrogen (H) as a constituent element, the effect of cleaving the bonding site of the oxygen atom of the magnesium oxide or the like to remove the oxygen atom can be further enhanced. Incidentally, a gas that causes a penning effect in combination with hydrogen, such as argon gas, helium gas, or neon gas, may be contained in the source gas. According to this, the hydrogen plasma concentration can be maintained high and the hydrogen plasma can be generated stably and widely, and thereby improvement in the production rate of magnesium hydride is expected. In order to generate hydrogen plasma having a high density, for example, the pressure of the source gas is preferably reduced to an absolute pressure of about 10 to 150 Pa.

The hydrogen plasma may be any of microwave plasma (plasma excited by microwaves) and RF plasma (plasma excited by radio frequency (RF)). These plasmas may be pulse-excited or may be DC-excited.

Since a wide range of high-density non-equilibrium hydrogen plasma is generated by using the microwaves, the rate of producing magnesium hydride can be increased. Furthermore, since water generated by reacting the oxygen atom dissociated from magnesium oxide or the like with hydrogen plasma can be effectively evaporated by heating or ionized by the microwaves, it can be suppressed that the produced magnesium hydride and water are reacted to revert to magnesium oxide or the like. According to this, the rate of producing magnesium hydride can be increased.

As the microwaves, for example, microwaves of a frequency band that can be used in industry and of a frequency of 1 GHz or greater to enable high-density non-equilibrium hydrogen plasma to be generated can be used, and microwaves of a frequency of 2.45 GHz can be suitably used.

In the case of the microwave plasma, for example, the microwave electrical power when generating a hydrogen plasma atmosphere can be set to 300 W or more. Furthermore, the time for the plasma treatment of the above-described raw material mixture can be set, for example, 1 hour or shorter and may be 0.5 hours or shorter, although depending on the amount of the raw material mixture and the plasma density.

On the other hand, since the RF plasma is plasma widely used in industry, both the apparatus cost and the operation cost can be suppressed to be low. Since a wide range of non-equilibrium hydrogen plasma is generated by the RF plasma, the rate of producing magnesium hydride can be increased. An excitation frequency used in generation of the RF plasma is typically 13.56 MHz in Japan from the viewpoint of legal restraints.

The plasma treatment step can be performed while heating the above-described raw material mixture. By the plasma treatment with respect to magnesium oxide or the like, oxygen dissociated from the magnesium oxide or the like and the hydrogen plasma are reacted to generate water in some cases. When the plasma treatment is performed while heating the above-described raw material mixture, it is easy to further suppress the reaction between the generated water and magnesium hydride generated by hydrogenating magnesium oxide or the like. Incidentally, in the case of using the microwave plasma as described above, this effect can be obtained even by the microwaves. The heating temperature can be set to 40° C. to 300° C.

The plasma in the plasma treatment step may be equilibrium plasma. According to this, the hydrogen plasma density and the ion temperature can be increased, and thus the effect of cleaving the bonding site of the oxygen atom of the magnesium oxide or the like to dissociate the oxygen atom is enhanced. According to this, the rate of producing magnesium hydride can be increased. Furthermore, since water generated by bonding the oxygen atom dissociated from magnesium oxide or the like to hydrogen plasma can be effectively evaporated or ionized by high energy, it can be prevented that the produced magnesium hydride and water are reacted to revert to magnesium oxide or the like. According to this, the rate of producing magnesium hydride can be increased.

The plasma treatment step can be performed while fluidizing the above-described raw material mixture. According to this, the above-described raw material mixture can be evenly treated by the plasma.

The plasma treatment step can be performed while supplying a thermal electron. Since hydride ion (H) generated by reaction between the hydrogen plasma and the thermal electron accelerates the hydrogenation of the magnesium-based raw material, the rate of producing magnesium hydride can be increased.

As the magnesium-based raw material, at least one selected from the group consisting of magnesium, magnesium hydroxide, and magnesium oxide is used. Of these, for example, considering a production process of tetrahydroborate described below, magnesium oxide can be suitably used. The reason for this is, as described below, that magnesium oxide is obtained as a by-product when producing tetrahydroborate using magnesium hydride, and thus the magnesium oxide can be used again as a raw material for producing magnesium hydride.

The average particle size of the magnesium hydride as the autocatalyst can be set to 0.0001 to 3 mm from the viewpoint of reactivity with the magnesium-based raw material. The magnesium hydride can be formed in a particulate shape (spherical shape).

Since a plasma treatment step generally used in semiconductor process or the like can be used, both the apparatus cost and the operation cost can be suppressed to be low. The production method according to the present embodiment including the plasma treatment step can be said to be suitable for industrial application.

(Raw Material Mixture Preparation Step)

The production method according to the present embodiment may further include a raw material mixture preparation step of obtaining the raw material mixture by mixing the magnesium-based raw material and the magnesium hydride before the plasma treatment step. That is, the raw material mixture may be obtained by the raw material mixture preparation step of obtaining the raw material mixture by mixing the magnesium-based raw material and the magnesium hydride before the plasma treatment step.

The mass ratio of the magnesium hydride to the mass of the magnesium-based raw material in the raw material mixture is preferably 1/1000 to 1/1 and more preferably 1/100 to 1/10. When the mass ratio is 1/1000 or more, the magnesium-based raw material is likely to be reduced or hydrogenated; on the other hand, when the mass ratio is 1/1 or less, the use amount of the magnesium hydride, which acts as a catalyst, is suppressed, and thus cost is likely to be lowered.

<Apparatus for Producing Magnesium Hydride>

FIG. 1 is a schematic diagram illustrating an example of an apparatus for producing magnesium hydride. An apparatus 100 illustrated in FIG. 1 includes: a raw material mixture treatment mechanism including a reaction chamber 10 which is designed to allow an atmosphere and a pressure to be adjusted, a sample holder 11 which is provided inside the reaction chamber 10 and on which a raw material mixture S can be placed, an infrared heating device 12 which is provided outside the reaction chamber 10 and is used for heating the sample holder 11, a conductive glass rod 13 for conducting infrared rays from the infrared heating device 12 to the sample holder 11, a vibration generator 14 for fluidizing the raw material mixture S in the sample holder 11, a vacuum pump 16 which is attached to the reaction chamber 10 through a pipe 15 and can exhaust the atmosphere in the reaction chamber 10, and a filament 17 generating a thermal electron in the reaction chamber 10; a microwave generation mechanism including a microwave generator 20, an isolator 21, a power monitor 22, a tuner 23, and a rectangular coaxial waveguide converter 24; and a source gas supply mechanism including a hydrocarbon gas cylinder 30, a hydrogen gas cylinder 31, and a hydrogen mixed gas cylinder 32.

Furthermore, the apparatus 100 includes a flexible coaxial waveguide 40 conducting microwaves oscillated from the microwave generation mechanism to the raw material mixture treatment mechanism, a quartz plate (dielectric substance) 41 which is provided between the flexible coaxial waveguide 40 and the reaction chamber 10 and through which the microwaves can propagate while shielding the atmosphere, and a pipe 42 supplying the source gas supplied from the source gas supply mechanism to the raw material mixture treatment mechanism.

Incidentally, in the reaction chamber 10, the pressure of the introduced source gas is reduced to a predetermined pressure, and electrons accelerated by the electric field caused by the microwaves and source gas molecules are ionized by collision, and thereby plasma P is generated. According to this, the raw material mixture is subjected to the plasma treatment, and thereby magnesium hydride can be obtained.

<Method for Producing Tetrahydroborate>

As the method for producing tetrahydroborate, the following methods (1) to (4) are mentioned:

(1) a method using a mechanochemical treatment;

(2) a method using a high-temperature and high-pressure treatment;

(3) a method using a plasma treatment; and (4) a method using a thermal treatment.

As a method for producing tetrahydroborate by hydrogenating borate, a method of reacting a sodium metaborate powder and a magnesium powder for about 2 hours under a hydrogen atmosphere at about 550° C. and 2.3 MPa has been known (for example, see Japanese Unexamined Patent Publication No. 2004-224684). Furthermore, as another method, a method of reacting a sodium metaborate powder and granular aluminum for about 1 hour under a hydrogen atmosphere at about 300° C. and 1 MPa while rolling and pulverizing the granular aluminum has been known (for example, see International Publication WO 2015/190403).

In the production field of tetrahydroborate, from the viewpoint of industrial application, various production methods have been studied.

(1) Method Using Mechanochemical Treatment

A method for producing tetrahydroborate according to the present embodiment can include a mechanochemical treatment step of subjecting an object to be treated containing borate and magnesium hydride obtained by the above-described method for producing magnesium hydride to a mechanochemical treatment.

(Mechanochemical Treatment Step)

In this step, for example, in the case of using sodium metaborate ($NaBO_2$) as the borate and magnesium hydride as the reducing agent, the following chemical reaction is considered to occur.

$$NaBO_2 + 2MgH_2 \rightarrow NaBH_4 + 2MgO \qquad (2)$$

As a means for performing the mechanochemical treatment step using pulverizing media, for example, a ball mill is mentioned. The ball mill has a high pulverization treatment efficiency and can efficiently cause the mechanochemical effect. According to this, tetrahydroborate can be produced at a high rate and the production cost can be suppressed to be low.

Incidentally, in the present embodiment, the ball mill means a ball mill in a broad sense (see Powder Technology Handbook, 2nd edition), and is a concept that includes a so-called tumbling ball mill (a pot mill, a tube mill, and a conical mill), a vibrating ball mill (a circular vibration type vibration mill, a rotary vibration mill, and a centrifugal mill), and a planetary mill.

As a treatment atmosphere in the case of performing the mechanochemical treatment by a ball mill, an inert gas atmosphere such as nitrogen, argon, helium, or neon and a gas atmosphere containing hydrogen (H) as a constituent element are mentioned. Examples of the gas containing hydrogen (H) as a constituent element include hydrogen gas, hydrocarbon gas, and $NH_3$ gas. Incidentally, by using hydrocarbon ($CH_4$, $C_2H_2$, $C_6H_6$, or the like) in advance, protide for accelerating the reaction can be easily supplied. According to this, the production efficiency can be further improved.

Furthermore, as a means for performing the mechanochemical treatment step using pulverizing media, for example, a medium stirring mill is mentioned. The medium stirring mill is an apparatus in which a pulverizing container is filled with pulverizing media similarly to a ball mill, the pulverizing media are strongly stirred along with an object to be pulverized by a stirring apparatus to pulverize the object to be pulverized, and thereby the kinetic energy of the stirring apparatus is applied to the object to be pulverized through pulverizing media to pulverize the object to be pulverized. The medium stirring mill has a feature in that high colliding force, friction force, or compressing force is applied to an object to be pulverized and high-volume processing is easily performed, and thus the medium stirring mill is easy to obtain the mechanochemical effect and is suitable for low-cost processing. Therefore, in the present embodiment, it is more preferable to use the medium stirring mill.

Examples of materials for the pulverizing media include chromium steel, stainless steel, zirconia, alumina, stabilized zirconia, partially stabilized zirconia, silicon nitride, silica, titania, and tungsten. Furthermore, and the average diameter of the pulverizing media can be set to 2 to 500 mm. As the pulverizing media, spherical media are preferred and true spherical media may be used. As the pulverizing media are closer to a true spherical shape, the kinetic energy of the stirring apparatus is likely to act on an object to be treated through the pulverizing media.

As another means for performing the mechanochemical treatment step, for example, an impact type pulverizer is mentioned. The impact type pulverizer is an apparatus of applying high colliding force, friction force, or compressing force to an object to be pulverized by utilizing impact force caused by rotation of a rotor on which a hammer, a blade, a pin, or the like is fixedly provided. This method has a feature in that high colliding force, friction force, or compressing force is applied to an object to be pulverized and high-volume processing is easily performed, and thus the impact type pulverizer is easy to obtain the mechanochemical effect and is suitable for low-cost processing. Therefore, in the present embodiment, the impact type pulverizer can also be used.

The average particle size of the magnesium hydride as the reducing agent can be set to 0.0001 to 3 mm from the viewpoint of reactivity with the borate. The magnesium hydride can be formed in a particulate shape (spherical shape).

(Preheating Step)

The production method according to the present embodiment may further include a preheating step of heating the borate before the mechanochemical treatment step. By this step, water contained as crystalline water in a borate hydrate can be removed in advance. Therefore, unnecessary moisture content does not exist in the mechanochemical treatment step, the mechanochemical treatment efficiency can be improved, and the rate of producing tetrahydroborate can be increased.

The preheating step can be performed, for example, under conditions of 40° C. to 360° C. and 0.1 to 6 hours, although depending on the type and the amount of the borate.

(Borate Preparation Step)

The production method according to the present embodiment may further include a step of obtaining borate by reacting tetrahydroborate with water before the mechanochemical treatment step (and in the case of providing a preheating step, before the preheating step). Tetrahydroborate is used as a hydrogen carrier, water is added to the tetrahydroborate at the demand site of hydrogen to thereby extract hydrogen for use, borate that is a residue generated in the chemical reaction thereof is then returned to the hydrogen supply site to hydrogenate the borate again, and thereby tetrahydroborate can be reproduced. Since hydrogen can be transported and stored by repeatedly causing dehydrogenation and rehydrogenation, hydrogen can be transported and stored at low cost. For example, in the case of using sodium tetrahydroborate as the tetrahydroborate, the following reaction (3) is considered to occur in this step.

$$NaBH_4 + 2H_2O \rightarrow NaBO_2 + 4H_2 \qquad (3)$$

(Borate)

Examples of the borate include borates such as metaborate, tetraborate, and pentaborate. Examples of the metaborate include $NaBO_2$, $KBO_2$, $LiBO_2$, $Ca(BO_2)_2$, and $Mg(BO_2)_2$. Examples of the tetraborate include $Na_2B_4O_7$, $Na_2O \cdot 2B_2O_3$, $K_2O \cdot B_2O_3$, $Li_2B_4O_7$, and $Mg_3B_4O_9$. Examples of the pentaborate include $NaB_5O_8$, $Na_2O \cdot 5B_2O_3$, $KB_5O_8$, $K_2O \cdot 5B_2O_9$, and $LiB_5O_8$. Furthermore, $Na_2B_4O_7 \cdot 10H_2O$, $Na_2B_4O_7 \cdot 4H_2O$, $Ca_2B_6O_{11} \cdot 5H_2O$, $CaNaB_5O_9 \cdot 6H_2O$, $Mg_7Cl_2B_{17}O_{30}$, and the like that are natural borate minerals can also be used. From the viewpoints of ease of acquisition, acquisition cost, chemical stability, ease of hydrogen desorption, hydrogen storage density, and the like, sodium metaborate may be used as the borate.

The borate can be formed into a powder shape from the viewpoint of further improving the mechanochemical treatment efficiency. At this time, the average particle size of the borate can be set to 1 mm or less, and may be 500 μm or less or 100 μm or less. The lower limit is not particularly limited, and can be set to 0.1 μm.

(Tetrahydroborate)

As the tetrahydroborate, hydrides corresponding to the borates exemplified above are mentioned. For example, in the case of using metaborate as the borate, $NaBH_4$, $KBH_4$, $LiBH_4$, $Ca(BH_4)_2$, $Mg(BH_4)_2$, and the like are mentioned.

(Separation Step)

In the treated object obtained after the above-described steps, tetrahydroborate, magnesium oxide, and, depending on the situation, unreacted borate or magnesium hydride mixedly exist. Therefore, the production method according to the present embodiment may further include a separation step of separating tetrahydroborate as a target substance from the treated object. Examples of the separation method (classification method) include a gravitational classification method, an inertial classification method, and a centrifugal classification method.

(2) Method Using High-Temperature and High-Pressure Treatment

The method for producing tetrahydroborate according to the present embodiment may include a high-temperature and high-pressure treatment step of subjecting an object to be treated containing borate and magnesium hydride obtained by the above-described method for producing magnesium hydride to a thermal treatment under conditions including a temperature of 350° C. or higher and an absolute pressure of 0.2 MPa or more.

(High-Temperature and High-Pressure Treatment Step)

In this step, for example, in the case of using sodium metaborate ($NaBO_2$) as the borate and magnesium hydride as the reducing agent, the following reaction (4) is considered to occur.

$$NaBO_2 + 2MgH_2 \rightarrow NaBH_4 + 2MgO \quad (4)$$

As a means for performing the high-temperature and high-pressure treatment step, for example, an autoclave is mentioned. Since the autoclave can simply realize a high-temperature and high-pressure condition, the chemical reaction acceleration effect can be efficiently caused. According to this, tetrahydroborate can be produced at a high rate and the production cost can be suppressed to be low.

As a treatment atmosphere in the case of performing an autoclave treatment, an inert gas atmosphere such as nitrogen, argon, helium, or neon and a gas atmosphere containing hydrogen (H) as a constituent element are mentioned. Examples of the gas containing hydrogen (H) as a constituent element include hydrogen gas, hydrocarbon gas, and $NH_3$ gas. Incidentally, by using hydrocarbon ($CH_4$, $C_2H_2$, $C_6H_6$, or the like) in advance, protide for accelerating the reaction can be easily supplied. According to this, the production efficiency can be further improved.

The setting temperature of the autoclave treatment can be set to 350° C. or higher, and may be 450° C. or higher or 550° C. or higher. The upper limit of the setting temperature can be set, for example, to 750° C. Furthermore, the setting pressure can be set to an absolute pressure of 0.2 MPa or more, and may be an absolute pressure of 0.5 MPa or more or 1 MPa or more. The upper limit of the setting pressure can be set, for example, to an absolute pressure of 2 MPa. The treatment time can be set to 2 to 4 hours. The chemical reaction is easily advanced by increasing the setting temperature and the setting pressure, but it is preferable to set the setting temperature to 550° C. and the setting pressure to (an absolute pressure of) 1 MPa.

The average particle size of the magnesium hydride as the reducing agent can be set to 0.0001 to 3 mm from the viewpoint of reactivity with the borate. The magnesium hydride can be formed in a particulate shape (spherical shape).

(Preheating Step, Borate Preparation Step, and Separation Step)

The production method according to the present embodiment may further include the preheating step, the borate preparation step, the separation step, and the like described above.

(3) Method Using Plasma Treatment

The method for producing tetrahydroborate according to the present embodiment includes a plasma treatment step of exposing a mixture of borate and magnesium hydride to hydrogen plasma or inert gas plasma. The magnesium hydride may be magnesium hydride obtained by the above-described method for producing magnesium hydride or may be magnesium hydride obtained by other methods.

(Plasma Treatment Step)

In the plasma treatment step, borate is treated by hydride ion ($H^-$) released from magnesium hydride. At this time, by using the hydrogen plasma, the borate can be treated even by hydrogen radical (H radical) or hydrogen ion. Incidentally, since magnesium hydride that may function as a reducing agent is used, the borate can be treated even by using inert gas.

In the plasma treatment step, the bonding site of the oxygen atom of the borate is cleaved to remove the oxygen atom, the hydrogen atom is bonded to a pair of electrons to which the oxygen atom had been bonded, and thereby hydrogenation of the borate is performed. For example, in the case of using sodium metaborate as the borate, the following reaction (5-1) is considered to occur in this step.

$$NaBO_2 + 2MgH_2 \rightarrow NaBH_4 + 2MgO \quad (5\text{-}1)$$

Incidentally, in the case of using hydrogen plasma, the following reaction (5-2) is considered to also occur in this step.

$$NaBO_2 + 4H_2 \rightarrow NaBH_4 + 2H_2O \quad (5\text{-}2)$$

In this step, upon producing tetrahydroborate by hydrogenating borate, it is not necessary to maintain a reaction chamber at a high temperature and a high pressure, and it is not necessary to continuously charge a large quantity of energy from the outside. Furthermore, since the treatment time is considerably shortened by using the plasma as compared to a conventional process, productivity can be improved. Therefore, borate is hydrogenated, and thereby tetrahydroborate can be produced at a high rate and in quantity.

Since a plasma treatment step generally used in semiconductor process or the like can be used, both the apparatus cost and the operation cost can be suppressed to be low. As such, the production method according to the present embodiment including the plasma treatment step can be said to be suitable for industrial application.

The hydrogen plasma used in the hydrogen plasma treatment can be generated by using a gas containing hydrogen (H) as a constituent element, for example, a source gas containing at least one of hydrogen gas and hydrocarbon gas. Furthermore, $NH_3$ gas or the like can also be used. Incidentally, by using a gas containing an element, which is more easily oxidized than hydrogen, such as hydrocarbon ($CH_4$, $C_2H_2$, $C_6H_6$, or the like), the effect of cleaving the bonding site of the oxygen atom of the borate to remove the oxygen atom can be further enhanced. According to this, improvement in the production rate of tetrahydroborate is expected. For the same effect, a gas containing an element, which is more easily oxidized than hydrogen, such as carbon monoxide, may be contained in the source gas. By using a combination of such a gas with the gas containing hydrogen (H) as a constituent element, the effect of cleaving the bonding site of the oxygen atom of the borate to remove the oxygen atom can be further enhanced. Incidentally, a gas that causes a penning effect in combination with hydrogen, such as argon gas, helium gas, or neon gas, may be contained in the source gas. According to this, the hydrogen plasma concentration can be maintained high and the hydrogen plasma can be generated stably and widely, and thereby improvement in the production rate of tetrahydroborate is expected. In order to generate hydrogen plasma having a high density, for example, the pressure of the source gas is preferably reduced to an absolute pressure of about 10 to 150 Pa.

The inert gas plasma used in the inert gas plasma treatment may be generated by using a source gas containing at least one selected from the group consisting of nitrogen gas, argon gas, helium gas, and neon gas.

The plasma may be any of microwave plasma (plasma excited by microwaves) and RF plasma (plasma excited by radio frequency (RF)). These plasmas may be pulse-excited or may be DC-excited.

Since a wide range of high-density non-equilibrium plasma is generated by using the microwaves, the rate of producing tetrahydroborate can be increased. Furthermore, since water generated by reacting the oxygen atom dissociated from borate with plasma can be effectively evaporated by heating or ionized by the microwaves, it can be suppressed that the produced tetrahydroborate and water are reacted to revert to borate. According to this, the rate of producing tetrahydroborate can be increased.

As the microwaves, for example, microwaves of a frequency band that can be used in industry and of a frequency of 1 GHz or greater to enable high-density non-equilibrium plasma to be generated can be used, and microwaves of a frequency of 2.45 GHz can be suitably used.

In the case of the microwave plasma, for example, the microwave electrical power when generating a plasma atmosphere can be set to 300 W or more. Furthermore, the time for the plasma treatment of the above-described mixture can be set, for example, 1 hour or shorter and may be 0.5 hours or shorter, although depending on the amount of the mixture and the plasma density.

On the other hand, since the RF plasma is plasma widely used in industry, both the apparatus cost and the operation cost can be suppressed to be low. Since a wide range of non-equilibrium plasma is generated by the RF plasma, the rate of producing tetrahydroborate can be increased. An excitation frequency used in generation of the RF plasma is typically 13.56 MHz in Japan from the viewpoint of legal restraints.

The plasma treatment step can be performed while heating the above-described mixture. In this step, by the plasma treatment with respect to borate, oxygen dissociated from the borate and the hydrogen plasma are reacted to generate water. Therefore, when the plasma treatment is performed while heating the borate, it is easy to further suppress the reaction between the generated water and tetrahydroborate generated by hydrogenating borate. Incidentally, in the case of using the microwave plasma as described above, this effect can be obtained even by the microwaves. The heating temperature can be set to 40° C. to 300° C.

The plasma in the plasma treatment step may be equilibrium plasma. According to this, the plasma density and the ion temperature can be increased, and thus the effect of cleaving the bonding site of the oxygen atom of the borate to dissociate the oxygen atom is enhanced. According to this, the rate of producing tetrahydroborate can be increased. Furthermore, since water generated by bonding the oxygen atom dissociated from borate to plasma can be effectively evaporated or ionized by high energy, it can be prevented that the produced tetrahydroborate and water are reacted to revert to borate. According to this, the rate of producing tetrahydroborate can be increased.

The plasma treatment step can be performed while fluidizing the above-described mixture. According to this, the mixture can be evenly treated by the plasma.

In the case of performing the plasma treatment step by hydrogen plasma, the plasma treatment step can be performed while supplying a thermal electron. By hydride ion (W) generated by reaction between the hydrogen plasma and the thermal electron, the rate of producing tetrahydroborate can be increased.

The mass ratio of the magnesium hydride to the mass of the borate in the mixture of the borate and the magnesium hydride is preferably 1/5 to 5/1 and more preferably 1/2 to 2/1. When the mass ratio is 1/5 or more, the borate is likely to be reduced or hydrogenated; on the other hand, when the mass ratio is 5/1 or less, the use amount of the magnesium hydride is suppressed, and thus cost is likely to be lowered.

The mixture may further contain a hygroscopic agent. That is, the borate may be provided to the plasma treatment along with a hygroscopic agent. Examples of the hygroscopic agent include quicklime, silica gel, bentonite, magnesium chloride, and calcium chloride. According to this, since water generated by the plasma treatment can be removed as described above, the plasma treatment efficiency can be further improved.

(Preheating Step, Borate Preparation Step, and Separation Step)

The production method according to the present embodiment may further include the preheating step, the borate preparation step, the separation step, and the like described above.

In the method for producing tetrahydroborate according to the present embodiment, the apparatus for producing magnesium hydride as illustrated in FIG. 1 can be used. As the raw material mixture, a mixture of borate and magnesium hydride can be used.

(4) Method Using Thermal Treatment

The method for producing tetrahydroborate according to the present embodiment includes a thermal treatment step of heating a mixture of borate and magnesium hydride to 350° C. or higher in a gas atmosphere containing hydrogen (H) as a constituent element.

(Thermal Treatment Step)

In the thermal treatment step, the above-described mixture is treated by hydrogen radical (H radical) generated from the gas containing hydrogen (H) as a constituent element. At this time, since the magnesium hydride that may function as a reducing agent is used, the borate can be treated even by hydride ion ($H^-$) released from the magnesium hydride.

In the thermal treatment step, the bonding site of the oxygen atom of the borate is cleaved to remove the oxygen atom, the hydrogen radical is bonded to a pair of electrons to which the oxygen atom had been bonded, and thereby hydrogenation of the borate is performed. For example, in the case of using sodium metaborate as the borate, the following reactions (6-1) and (6-2) are considered to occur in this step.

$$NaBO_2 + 2MgH_2 \rightarrow NaBH_4 + 2MgO \qquad (6\text{-}1)$$

$$NaBO_2 + 8H^* \rightarrow NaBH_4 + 2H_2O \qquad (6\text{-}2)$$

In this step, upon producing tetrahydroborate by hydrogenating borate, it is not necessary to maintain a reaction chamber at a high temperature and a high pressure, and it is not necessary to continuously charge a large quantity of energy from the outside. Furthermore, since the treatment time is considerably shortened by using the magnesium hydride as compared to a conventional process, productivity can be improved. Therefore, borate is hydrogenated, and thereby tetrahydroborate can be produced at a high rate and in quantity.

Examples of the gas containing hydrogen (H) as a constituent element include hydrogen gas, ammonia ($NH_3$) gas, and hydrocarbon gas. By using ammonia gas, the heating temperature of the mixture necessary in the thermal treatment step can be suppressed to be low. The reason for this is that ammonia is relatively easily dissociated and hydrogen radical by dissociation of ammonia is likely to be generated in the vicinity of the mixture even at a low mixture temperature. Furthermore, by using a gas containing an element, which is more easily oxidized than hydrogen, such as hydrocarbon ($CH_4$, $C_2H_2$, $C_6H_6$, or the like), the effect of cleaving the bonding site of the oxygen atom of the borate to remove the oxygen atom can be further enhanced. According to this, improvement in the production rate of tetrahydroborate is expected. For the same effect, a gas containing an element, which is more easily oxidized than hydrogen, such as carbon monoxide, may be contained in the gas atmosphere containing hydrogen (H) as a constituent element. By using a combination of such a gas with the gas containing hydrogen (H) as a constituent element, the effect of cleaving the bonding site of the oxygen atom of the borate to remove the oxygen atom can be further enhanced.

Incidentally, in a case where the thermal treatment step is performed while generating plasma in the system as described below, a gas that causes a penning effect in combination with hydrogen, such as argon gas, helium gas, or neon gas, may be contained in the gas atmosphere containing hydrogen (H) as a constituent element. According to this, the plasma concentration can be maintained high and the plasma can be generated stably and widely, and thereby improvement in the production rate of tetrahydroborate is expected.

From the viewpoint of easily generating hydrogen radical (H radical) generated from the gas containing hydrogen (H) as a constituent element, the pressure in the system in the thermal treatment step is preferably an absolute pressure of about 10 to 150 Pa. Incidentally, in the case of generating plasma, by reducing the pressure of the source gas to this level, the plasma density can be increased.

From the viewpoint of easily generating hydrogen radical (H radical) generated from the gas containing hydrogen (H) as a constituent element, the thermal treatment temperature in the thermal treatment step is 350° C. or higher and may be 400° C. or higher. The upper limit of the thermal treatment temperature is not particularly limited, and can be set to, for example, 600° C. The reaction between water generated by reacting oxygen dissociated from the borate with hydrogen and tetrahydroborate is suppressed by heat of the thermal treatment. The time for the thermal treatment of the above-described mixture can be set, for example, 1 hour or shorter and may be 0.5 hours or shorter, although depending on the amount or the like of the mixture.

Since a thermal treatment step generally used in semiconductor process or the like can be used, both the apparatus cost and the operation cost can be suppressed to be low. The production method according to the present embodiment including the thermal treatment step can be said to be suitable for industrial application.

The thermal treatment step may be performed while exposing the mixture to plasma, that is, while generating plasma in the system. The plasma used in the plasma treatment is generated from the source gas containing the above-described gas containing hydrogen (H) as a constituent element.

The plasma may be any of microwave plasma (plasma excited by microwaves) and RF plasma (plasma excited by radio frequency (RF)). These plasmas may be pulse-excited or may be DC-excited.

Since a wide range of high-density non-equilibrium plasma is generated by using the microwaves, the rate of producing tetrahydroborate can be increased. Furthermore, since water generated by reacting the oxygen atom dissociated from borate with plasma can be effectively evaporated by heating or ionized by the microwaves, it can be suppressed that the produced tetrahydroborate and water are reacted to revert to borate. According to this, the rate of producing tetrahydroborate can be increased.

As the microwaves, for example, microwaves of a frequency band that can be used in industry and of a frequency of 1 GHz or greater to enable high-density non-equilibrium plasma to be generated can be used, and microwaves of a frequency of 2.45 GHz can be suitably used.

In the case of the microwave plasma, for example, the microwave electrical power when generating a plasma atmosphere can be set to 300 W or more.

On the other hand, since the RF plasma is plasma widely used in industry, both the apparatus cost and the operation cost can be suppressed to be low. Since a wide range of non-equilibrium plasma is generated by the RF plasma, the rate of producing tetrahydroborate can be increased. An excitation frequency used in generation of the RF plasma is typically 13.56 MHz in Japan from the viewpoint of legal restraints.

The plasma may be equilibrium plasma. According to this, the plasma density and the ion temperature can be increased, and thus the effect of cleaving the bonding site of the oxygen atom of the borate to dissociate the oxygen atom is enhanced. According to this, the rate of producing tetrahydroborate can be increased. Furthermore, since water generated by bonding the oxygen atom dissociated from borate to plasma can be effectively evaporated or ionized by high energy, it can be prevented that the produced tetrahydroborate and water are reacted to revert to borate. According to this, the rate of producing tetrahydroborate can be increased.

The thermal treatment step can be performed while fluidizing the above-described mixture. According to this, the mixture can be evenly treated by the plasma.

In the case of performing the thermal treatment step while generating plasma in the system, the thermal treatment step can be performed while further supplying a thermal electron. Hydride ion ($H^-$) generated by reaction between the plasma and the thermal electron can increase the rate of producing tetrahydroborate.

The mass ratio of the magnesium hydride to the mass of the borate in the mixture of the borate and the magnesium hydride is preferably 1/5 to 5/1 and more preferably 1/2 to 2/1. When the mass ratio is 1/5 or more, the borate is likely to be reduced or hydrogenated; on the other hand, when the mass ratio is 5/1 or less, the use amount of the magnesium hydride is suppressed, and thus cost is likely to be lowered.

The mixture may further contain a hygroscopic agent. That is, the borate may be provided to the thermal treatment along with a hygroscopic agent. Examples of the hygroscopic agent include quicklime, silica gel, bentonite, magnesium chloride, and calcium chloride. According to this, the thermal treatment efficiency can be further improved.

(Preheating Step, Borate Preparation Step, and Separation Step)

The production method according to the present embodiment may further include the preheating step, the borate preparation step, the separation step, and the like described above.

In the method for producing tetrahydroborate according to the present embodiment, the apparatus for producing magnesium hydride as illustrated in FIG. 1 can be used. As the raw material mixture, a mixture of borate and magnesium hydride can be used. Furthermore, an ammonia gas cylinder can be used instead of the hydrocarbon gas cylinder.

EXAMPLES

Hereinafter, the present disclosure will be described in more detail by means of Examples; however, the present disclosure is not limited to these Examples.

<Production of Magnesium Hydride>

Experimental Example 1

Production of magnesium hydride was performed by using the apparatus illustrated in FIG. 1. 0.5 g of MgO (magnesium oxide: manufactured by KISHIDA CHEMICAL Co., Ltd., Product No. 020-46775) powder was prepared as the magnesium-based raw material, and 0.033 g of $MgH_2$ (magnesium hydride: manufactured by FUJIFILM Wako Pure Chemical Corporation, Product No. 137-17391) powder was added thereto, followed by stirring and mixing by using a mortar and a pestle. The obtained raw material mixture (sample S) was placed on the sample holder 11, and the sample holder 11 was placed inside the reaction chamber 10. As the reaction chamber 10, a reaction chamber having a volume of 2.5 L was used. The inside of the reaction chamber 10 was evacuated until the pressure reached $10^{-4}$ Pa, and the hydrogen gas was adjusted to have a flow rate of 50 sccm and then supplied into the reaction chamber 10. Then, the exhaust rate was adjusted so that the pressure in the reaction chamber 10 was maintained to be 110 Pa. The infrared heating device 12 was turned on, and the sample S was heated to 120° C. through the conductive glass rod 13 and the sample holder 11.

The microwave generator 20 was turned on, and microwaves of a frequency of 2.45 GHz were caused to enter in the reaction chamber 10. At this time, the microwave reflected power was adjusted by the tuner 23 so as to be minimized. The microwave incident power was 350 W, and the microwave reflected power was 70 W. Hydrogen plasma excited by the microwaves was generated in the reaction chamber 10, and thereby the sample S placed on the sample holder 11 was subjected to the plasma treatment. During the plasma treatment, vibration was applied to the sample holder 11 by the vibration generator 14 to fluidize the sample S. The plasma treatment time was set to 10 minutes.

After the elapse of the predetermined treatment time, the microwave generator 20, the vibration generator 14, and the infrared heating device 12 were turned off, and the supply of the hydrogen gas was stopped. Thereafter, the reaction chamber 10 was opened to the atmosphere, and the sample subjected to the plasma treatment was extracted.

Experimental Example 2

After adjustment of the microwave reflected power, the electric current was supplied to the filament 17 to increase the filament temperature up to 2000° C. According to this, a thermal electron was supplied into the reaction chamber 10. The plasma treatment was performed in the same manner as in Experimental Example 1 to obtain a sample subjected to the plasma treatment except for the above matter.

Experimental Example 3

A sample subjected to the plasma treatment was obtained in the same manner as in Experimental Example 1, except that Mg (magnesium metal: manufactured by Hayashi Pure Chemical Ind., Ltd., Product No. 13000045) powder was used as the magnesium-based raw material instead of the MgO powder and the plasma treatment time was set to 30 minutes.

Comparative Experimental Example 1

The plasma treatment was performed in the same manner as in Experimental Example 1 to obtain a sample subjected to the plasma treatment, except that magnesium hydride was not added to the magnesium-based raw material.

(Evaluation)

The evaluation of the products was performed by Raman spectrometry. It was found that, in all Experimental Examples, magnesium hydride was obtained. The intensities of peaks derived from $MgH_2$ in the vicinity of 950 to 960 $cm^{-1}$ (956 $cm^{-1}$) increased in the order of Experimental Example 2>Experimental Example 1>Experimental Example 3>Comparative Experimental Example 1. The intensities of peaks derived from MgHx in the vicinity of 250 to 265 $cm^{-1}$ (257 $cm^{-1}$) increased in the order of Experimental Example 3>Experimental Example 2>Experimental Example 1>Comparative Experimental Example 1.

(Observation)

Figure 2:
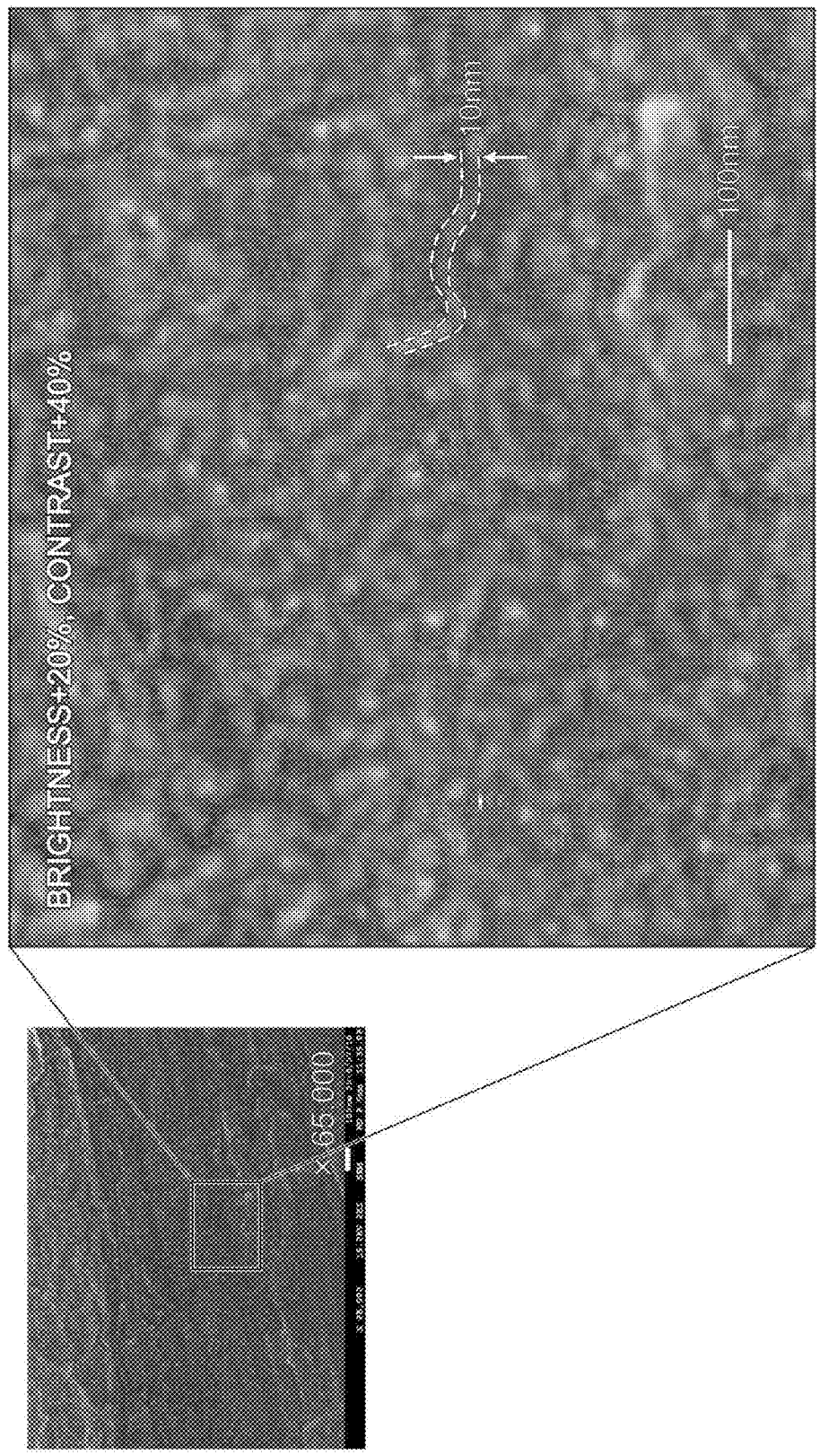
FIG. 2 is an SEM image of a sample obtained in Experimental Example 3.

The sample obtained in Experimental Example 3 was observed with a scanning electron microscope. FIG. 2 is an SEM image of a sample obtained in Experimental Example 3. As shown in FIG. 2, roughening of the Mg powder surface subjected to the hydrogen plasma treatment by the plasma was advanced, and ridge-shaped protrusions having a width of about 10 nm were evenly generated.

<Production of Tetrahydroborate>

(1) Mechanochemical Treatment $NaBO_2 \cdot 4H_2O$ (sodium metaborate tetrahydrate: manufactured by KISHIDA CHEMICAL Co., Ltd., content: 98% by mass) was prepared as the borate. This borate was heated at 360° C. for 2 hours while being subjected to the pulverization treatment by a ball mill to remove crystalline water, and thereby $NaBO_2$ (anhydrous sodium metaborate) was obtained. The average particle size of the obtained $NaBO_2$ was 100 μm. The average particle size was measured by a digital microscope. Furthermore, as the reducing agent, $MgH_2$ obtained in Experimental Example 1 described above was prepared.

Next, an object to be treated containing $NaBO_2$ and $MgH_2$ was subjected to the mechanochemical treatment by using a medium stirring mill. 7.6 g of $NaBO_2$ and 6.0 g of $MgH_2$ were respectively weighed and charged into a medium stirring mill container with pulverizing media, and then the mechanochemical treatment was performed. The treatment time was set to 6 hours.

The treated sample was extracted, and the measurement evaluation was performed by using an X-ray diffractometer (manufactured by Rigaku Corporation, MiniFlex600). As a result, peaks derived from $NaBO_2$ and $MgH_2$ as raw materials were not detected at all, and only peaks derived from $NaBH_4$ (sodium borohydride) and MgO (magnesium oxide) were detected.

From this result, it was found that the hydrogenation rate from $NaBO_2$ to $NaBH_4$ is almost 100%, and a sufficient amount of sodium borohydride is efficiently obtainable.

(2) High-Temperature and High-Pressure Treatment

Similarly to the case of the above-described mechanochemical treatment, $NaBO_2$ and $MgH_2$ were prepared.

Next, an object to be treated containing $NaBO_2$ and $MgH_2$ was subjected to the high-temperature and high-pressure treatment by using an autoclave. 3.8 g of $NaBO_2$ and 3.0 g of $MgH_2$ were respectively weighed and charged into an autoclave container, and the high-temperature and high-pressure treatment was performed under conditions including a temperature of 550° C. and an absolute pressure of 1 MPa. The treatment time was set to 4 hours.

The treated sample was extracted, and the measurement evaluation was performed by using an X-ray diffractometer (manufactured by Rigaku Corporation, MiniFlex600). As a result, peaks derived from $NaBO_2$ and $MgH_2$ as raw materials were not detected at all, and only peaks derived from $NaBH_4$ and MgO were detected.

From this result, it was found that the hydrogenation rate from $NaBO_2$ to $NaBH_4$ is almost 100%, and a sufficient amount of sodium borohydride is efficiently obtainable.

(3) Plasma Treatment (Plasma Treatment 1)

Production of tetrahydroborate was performed by using the apparatus illustrated in FIG. 1. $NaBO_2 \cdot 4H_2O$ (sodium metaborate tetrahydrate: manufactured by KISHIDA CHEMICAL Co., Ltd., content: 98% by mass) was prepared as the borate. This borate was heated at 360° C. for 2 hours while being subjected to the pulverization treatment by a ball mill to remove crystalline water, and thereby powdery $NaBO_2$ (anhydrous sodium metaborate) was obtained. The average particle size of the powdery $NaBO_2$ was 100 µm. The average particle size was measured by a digital microscope.

Next, 1.0 g of the powdery $NaBO_2$ was weighed, and 0.8 g of $MgH_2$ (magnesium hydride: manufactured by FUJIFILM Wako Pure Chemical Corporation, Product No. 137-17391) powder was added thereto, followed by stirring and mixing by using a mortar and a pestle. The obtained mixture (sample S) was placed on the sample holder 11, and the sample holder 11 was placed inside the reaction chamber 10. As the reaction chamber 10, a reaction chamber having a volume of 2.5 L was used. The inside of the reaction chamber 10 was evacuated until the pressure reached $10^{-4}$ Pa, and the hydrogen gas was adjusted to have a flow rate of 50 sccm and then supplied into the reaction chamber 10. Then, the exhaust rate was adjusted so that the pressure in the reaction chamber 10 was maintained to be 110 Pa. The infrared heating device 12 was turned on, and the sample S was heated to 160° C. through the conductive glass rod 13 and the sample holder 11.

The microwave generator 20 was turned on, and microwaves of a frequency of 2.45 GHz were caused to enter in the reaction chamber 10. At this time, the microwave reflected power was adjusted by the tuner 23 so as to be minimized. The microwave incident power was 350 W, and the microwave reflected power was 70 W. Hydrogen plasma excited by the microwaves was generated in the reaction chamber 10, and thereby the sample S placed on the sample holder 11 was subjected to the plasma treatment. During the plasma treatment, vibration was applied to the sample holder 11 by the vibration generator 14 to fluidize the sample S. The plasma treatment time was set to 30 minutes.

After the elapse of the predetermined treatment time, the microwave generator 20, the vibration generator 14, and the infrared heating device 12 were turned off, and the supply of the hydrogen gas was stopped. Thereafter, the reaction chamber 10 was opened to the atmosphere, and the sample subjected to the plasma treatment was extracted.

(Plasma Treatment 2)

The plasma treatment was performed in the same manner as in Plasma Treatment 1 to obtain a sample subjected to the plasma treatment, except that argon gas that is inert gas was used instead of the hydrogen gas.

(Plasma Treatment 3)

The plasma treatment was performed in the same manner as in Plasma Treatment 1 to obtain a sample subjected to the plasma treatment, except that $MgH_2$ obtained in Experimental Example 1 described above was used instead of $MgH_2$ (magnesium hydride: manufactured by FUJIFILM Wako Pure Chemical Corporation, Product No. 137-17391) powder.

(Evaluation)

The infrared absorption spectrum of the sample was measured by using Fourier transform infrared spectrophotometer FT/IR-6300 (manufactured by JASCO Corporation, product name). As a result of measurement, in all the treatment examples (Plasma Treatments 1 to 3), the peak of B—O bond derived from anhydrous sodium metaborate decreased, and the peak of B—H bond derived from sodium tetrahydroborate increased. According to this, it was confirmed that, by subjecting anhydrous sodium metaborate to the plasma treatment along with magnesium hydride, sodium tetrahydroborate was obtainable.

(4) Thermal Treatment (Thermal Treatment 1)

Production of tetrahydroborate was performed by using the apparatus illustrated in FIG. 1. $NaBO_2 \cdot 4H_2O$ (sodium metaborate tetrahydrate: manufactured by KISHIDA CHEMICAL Co., Ltd., content: 98% by mass) was prepared as the borate. This borate was heated at 360° C. for 2 hours while being subjected to the pulverization treatment by a ball mill to remove crystalline water, and thereby powdery $NaBO_2$ (anhydrous sodium metaborate) was obtained. The average particle size of the powdery $NaBO_2$ was 100 µm. The average particle size was measured by a digital microscope.

Next, 1.0 g of the powdery $NaBO_2$ was weighed, and 0.8 g of $MgH_2$ (magnesium hydride: manufactured by FUJIFILM Wako Pure Chemical Corporation, Product No. 137-17391) powder was added thereto, followed by stirring and mixing by using a mortar and a pestle. The obtained mixture (sample S) was placed on the sample holder 11, and the sample holder 11 was placed inside the reaction chamber 10. As the reaction chamber 10, a reaction chamber having a volume of 2.5 L was used. The inside of the reaction chamber 10 was evacuated until the pressure reached $10^{-4}$ Pa, and the ammonia gas was adjusted to have a flow rate of 50 sccm and then supplied into the reaction chamber 10. Then, the exhaust rate was adjusted so that the pressure in the reaction chamber 10 was maintained to be 110 Pa. The infrared heating device 12 was turned on, and the sample S was heated to 400° C. through the conductive glass rod 13 and the sample holder 11.

During the thermal treatment, vibration was applied to the sample holder 11 by the vibration generator 14 to fluidize the sample S. The thermal treatment time was set to 30 minutes.

After the elapse of the predetermined treatment time, the vibration generator 14 and the infrared heating device 12 were turned off, and the supply of the ammonia gas was stopped. Thereafter, the reaction chamber 10 was opened to the atmosphere, and the sample subjected to the thermal treatment was extracted.

(Thermal Treatment 2)

Production of tetrahydroborate was performed in the same manner as in Experimental Example 1, except that the thermal treatment of the sample S was performed while generating plasma in the reaction chamber 10. Specifically, the microwave generator 20 was turned on, and microwaves of a frequency of 2.45 GHz were caused to enter in the reaction chamber 10. At this time, the microwave reflected power was adjusted by the tuner 23 so as to be minimized. The microwave incident power was 350 W, and the microwave reflected power was 70 W. Ammonia plasma excited by the microwaves was generated in the reaction chamber 10, and thereby the sample S placed on the sample holder 11 was subjected to both the thermal treatment and the plasma treatment.

After the elapse of the predetermined treatment time, the microwave generator 20, the vibration generator 14, and the infrared heating device 12 were turned off, and the supply of the ammonia gas was stopped. Thereafter, the reaction chamber 10 was opened to the atmosphere, and the sample subjected to the thermal treatment was extracted.

(Thermal Treatment 3)

The thermal treatment was performed in the same manner as in Thermal Treatment 1 to obtain a sample subjected to the thermal treatment, except that $MgH_2$ obtained in Experimental Example 1 described above was used instead of $MgH_2$ (magnesium hydride: manufactured by FUJIFILM Wako Pure Chemical Corporation, Product No. 137-17391) powder.

(Evaluation)

The infrared absorption spectrum of the sample was measured by using Fourier transform infrared spectrophotometer FT/IR-6300 (manufactured by JASCO Corporation, product name). As a result of measurement, in all Experimental Examples, the peak of B—O bond derived from anhydrous sodium metaborate decreased, and the peak of B—H bond derived from sodium tetrahydroborate increased. According to this, it was confirmed that, by subjecting anhydrous sodium metaborate to the thermal treatment along with magnesium hydride, sodium tetrahydroborate was obtainable.

REFERENCE SIGNS LIST

10: reaction chamber, 11: sample holder, 12: infrared heating device, 13: conductive glass rod, 14: vibration generator, 15: pipe, 16: vacuum pump, 17: filament, 20: microwave generator, 21: isolator, 22: power monitor, 23: tuner, 24: rectangular coaxial waveguide converter, 30: hydrocarbon gas cylinder, 31: hydrogen gas cylinder, 32: hydrogen mixed gas cylinder, 40: flexible coaxial waveguide, 41: quartz plate (dielectric substance), 42: pipe, 100: apparatus for producing magnesium hydride, P: plasma, S: raw material mixture.

What is claimed is:

1. A method for producing magnesium hydride, the method comprising a plasma treatment step of exposing a raw material mixture of (i) at least one magnesium-based raw material selected from the group consisting of magnesium, magnesium hydroxide, and magnesium oxide, and (ii) magnesium hydride to hydrogen plasma.

2. The production method according to claim 1, wherein the plasma treatment step is performed while heating the raw material mixture.

3. The production method according to claim 1, wherein the plasma treatment step is performed while fluidizing the raw material mixture.

4. The production method according to claim 1, wherein the plasma treatment step is performed while supplying a thermal electron.

5. The production method according to claim 1, wherein a mass ratio of the magnesium hydride to a mass of the magnesium-based raw material is 1/1000 to 1/1.

6. The production method according to claim 1, further comprising a raw material mixture preparation step of obtaining the raw material mixture by mixing the magnesium-based raw material and the magnesium hydride before the plasma treatment step.

7. A method for producing tetrahydroborate, the method comprising:
   a magnesium hydride production step of exposing a raw material mixture of (i) at least one magnesium-based raw material selected from the group consisting of magnesium, magnesium hydroxide, and magnesium oxide, and (ii) magnesium hydride to hydrogen plasma; and
   a mechanochemical treatment step of subjecting an object to be treated containing borate and the magnesium hydride obtained by the magnesium hydride production step to a mechanochemical treatment.

8. The production method according to claim 7, wherein the mechanochemical treatment step is performed by using a medium stirring mill.

9. The production method according to claim 7, wherein the borate is sodium metaborate.

10. A method for producing tetrahydroborate, the method comprising:
    a magnesium hydride production step of exposing a raw material mixture of (i) at least one magnesium-based raw material selected from the group consisting of magnesium, magnesium hydroxide, and magnesium oxide, and (ii) magnesium hydride to hydrogen plasma; and
    a treatment step of subjecting an object to be treated containing borate and the magnesium hydride obtained by the magnesium hydride production step to a thermal treatment under conditions including a temperature of 350° C. or higher and an absolute pressure of 0.2 MPa or more.

11. A method for producing tetrahydroborate, the method comprising:
    a magnesium hydride production step of exposing a raw material mixture of (i) at least one magnesium-based raw material selected from the group consisting of magnesium, magnesium hydroxide, and magnesium oxide, and (ii) magnesium hydride to hydrogen plasma; and a plasma treatment step of exposing a mixture of borate and the magnesium hydride obtained by the magnesium hydride production step to hydrogen plasma or inert gas plasma.

12. The production method according to claim 11, wherein the hydrogen plasma is generated by using a source gas containing at least one of hydrogen gas and hydrocarbon gas.

13. The production method according to claim 11, wherein the inert gas plasma is generated by using a source gas containing at least one selected from the group consisting of nitrogen gas, argon gas, helium gas, and neon gas.

14. The production method according to claim 11, wherein the hydrogen plasma and the inert gas plasma is microwave plasma or RF plasma.

15. The production method according to claim 11, further comprising a preheating step of heating the mixture before the plasma treatment step.

16. The production method according to claim 11, wherein the plasma treatment step is performed while heating the mixture.

17. The production method according to claim 11, wherein the plasma treatment step is performed while fluidizing the mixture.

18. The production method according to claim 11, wherein an average particle size of the borate is 500 μm or less.

19. The production method according to claim 11, wherein the borate is sodium metaborate.

20. A method for producing tetrahydroborate, the method comprising:

a magnesium hydride production step of exposing a raw material mixture of (i) at least one magnesium-based raw material selected from the group consisting of magnesium, magnesium hydroxide, and magnesium oxide, and (ii) magnesium hydride to hydrogen plasma; and a thermal treatment step of heating a mixture of borate and the magnesium hydride obtained by the magnesium hydride production step to 350° C. or higher in a gas atmosphere containing hydrogen (H) as a constituent element.

21. The production method according to claim 20, wherein the thermal treatment step is performed while fluidizing the mixture.

22. The production method according to claim 20, wherein an average particle size of the borate is 500 μm or less.

23. The production method according to claim 20, wherein the borate is sodium metaborate.

* * * * *